United States Patent
Matsueda

(10) Patent No.: US 7,239,410 B2
(45) Date of Patent: Jul. 3, 2007

(54) PRINTING SYSTEM, DATA PROCESSING SYSTEM AND METHOD FOR CONFIRMING JOB PROCESS RESULT

(75) Inventor: Kazutaka Matsueda, Kanagawa (JP)

(73) Assignee: Canon Kabushiki Kaisha, Tokyo (JP)

( * ) Notice: Subject to any disclaimer, the term of this patent is extended or adjusted under 35 U.S.C. 154(b) by 926 days.

(21) Appl. No.: 09/949,709

(22) Filed: Sep. 12, 2001

(65) Prior Publication Data

US 2002/0030850 A1    Mar. 14, 2002

(30) Foreign Application Priority Data

Sep. 13, 2000    (JP) ............................. 2000-278187

(51) Int. Cl.
*G06F 15/00*    (2006.01)
*G06K 1/00*    (2006.01)

(52) U.S. Cl. .................. 358/1.15; 358/1.14; 358/1.16; 358/405; 400/63; 709/224

(58) Field of Classification Search ............... 358/1.15, 358/405; 707/500; 400/61, 63; 714/46; 715/500; 709/224

See application file for complete search history.

(56) References Cited

U.S. PATENT DOCUMENTS

| | | | | |
|---|---|---|---|---|
| 5,872,638 A | * | 2/1999 | Haze .......................... | 358/405 |
| 5,935,262 A | * | 8/1999 | Barrett et al. ................. | 714/46 |
| 6,055,063 A | * | 4/2000 | Yang et al. ................. | 358/1.15 |
| 6,587,861 B2 | * | 7/2003 | Wakai et al. ................ | 715/500 |
| 6,678,068 B1 | * | 1/2004 | Richter et al. ............. | 358/1.15 |
| 6,709,176 B2 | * | 3/2004 | Gotoh et al. ................ | 358/1.15 |
| 6,788,427 B1 | * | 9/2004 | Okigami .................... | 358/1.15 |
| 6,814,510 B1 | * | 11/2004 | Sabbagh et al. ............. | 400/63 |
| 6,894,793 B1 | * | 5/2005 | Roosen et al. ............. | 358/1.15 |
| 6,952,726 B1 | * | 10/2005 | White et al. ................ | 709/224 |
| 2005/0018249 A1 | * | 1/2005 | Miura et al. ............... | 358/1.15 |

FOREIGN PATENT DOCUMENTS

EP    0 986 001 A2    3/2000

* cited by examiner

*Primary Examiner*—David Moore
*Assistant Examiner*—Satwant Singh
(74) *Attorney, Agent, or Firm*—Fitzpatrick, Cella, Harper & Scinto

(57) ABSTRACT

Disclosed is a system that can precisely obtain process results, such as a paper ejection end, from a printer that receives and processes a print job, while reducing the load imposed on a network and the process loads imposed on the printer and a data processing apparatus. According to the present invention, from among all log information stored in the printer, a predetermined number of log information sets, beginning with the latest log, are obtained, and based on the obtained log information, the process result for the job is determined.

34 Claims, 7 Drawing Sheets

LOG QUEUE

LOG QUEUE MANAGEMENT AREA

FIG. 8

PRINTER INFO FILE

```
L-2260:
COLOR, DUPLEX, 7-BIN TRAY
4
16
L-950:
MONO, DUPLEX, 3-BIN TRAY
24
L-840:
MONO, SIMPLEX, NO TRAY
16
```

FIG. 9

| |
|---|
| PROGRAM FOR RECEIVING EVENT NOTICE FROM PRINTER |
| PROGRAM FOR OBTAINING JOB INFO IN PRINTER |
| PROGRAM FOR DISPLAYING PRINTER STATUS |
| PROGRAM FOR OBTAINING PRINT RESULT OF PRINTER |
| PROGRAM FOR CALCULATING NO. OF LOG RECORDS TO OBTAIN |
| PROGRAM FOR CALCULATING START POSITION OF LOG RECORDS TO OBTAIN |
| PROGRAM FOR DISCRIMINATING EJECTION RESULT |

PRINTING SYSTEM, DATA PROCESSING SYSTEM AND METHOD FOR CONFIRMING JOB PROCESS RESULT

BACKGROUND OF THE INVENTION

1. Field of the Invention

The present invention relates to a printing system for ensuring process results are obtained, such as a paper ejection end, from a printer that receives and prints a print job.

2. Related Background Art (1) In a conventional network printer that is part of a printing system, the document name for the last job for which paper ejection was terminated normally and printer status data are written in a unique area (an MIB area), and periodically, every ten seconds, for instance, a personal computer in the printing system obtains transmits to the network printer a message to obtain the above information (e.g., a message in which SNMP is the protocol used to SNMP to obtain MIB information), which it then uses to confirm the last end-of-job paper ejection and the status of the printer.

(2) Further, a conventional printer issues an event notice each time a page is ejected or when all the pages of a job have been ejected. Such an event notice is issued unidirectionally to a predetermined personal computer on a network that uses the protocol set UDP/IP. Therefore, upon receiving an event notice, a personal computer can use it to determine whether a paper ejection or an abnormality, such as a paper jam, has occurred at the printer, and can, as necessary, take appropriate action.

(3) There are some conventional printers that can store printing results so that they that can be read externally. This type of printer is polled at intervals by a personal computer to obtain the printing results.

SUMMARY OF THE INVENTION

However, the printer or the system described above has the following problems.

(1) Even when the MIB information in the MIB area in the printer indicates the document name of the last job (job A) for which paper ejection was normally terminated, if the personal computer obtains the MIB information after the paper ejection for the following job (job B) is completed, the data obtained will be for the document for that job (job B). That is, depending on the polling timing, the document name for a job may be replaced with the document name for the following job. Therefore, a personal computer may fail to acquire the document name for the preceding job (job A), and data reflecting the completion of the printing for that job may not be obtained.

(2) Unlike the protocol set TCP/IP, confirmation protocol is not required for UDP/IP. There is no guarantee, therefore, that an event notice will always be received by a personal computer. Of course, if a personal computer does not receive an event notice the printer need only reissue the notice, but then, however, the complexity of the required network process is increased.

(3) The volume of the printing results maintained in a printer for a single process is enormous. Therefore, when a personal computer must read all the data stored by a printer to obtain printing results for individual jobs, a huge load is imposed on the network, and accordingly, the loads imposed by the process on the printer and the personal computer are increased.

To resolve these problems, according to the present invention, log information is obtained from a printer, and the results of the process performed for a job are determined based on the obtained log information.

Further, according to the invention, a notification describing the process results for a job is transmitted by the printer to a data processing apparatus. When this notification is not issued, the log information is obtained and the process results for the job are determined based on the log information.

According to the present invention, based on the determination of the process results for a job, information detailing the process results is transmitted to an external device.

According to the invention, of the log information sets stored in a printer, a predetermined number of information sets are extracted beginning with the latest. And especially when a printer uses a queue to manage log information detailing the process results for individual jobs, a predetermined number of log information sets can be obtained by tracking backward from the queue addition position.

Furthermore, according to the present invention, the predetermined number of information entries is determined either based on the printer reproduction speed or based on the interval at which log information is accessed.

Since a function for receiving an event notice from a printer, a function for obtaining information from a printer for a queued printing job, and a function for obtaining printing results from the log of a printer are provided, printed paper ejection data can be confirmed exactly and at high speed. Especially, even when the process for the reception of an event notice from a printer fails, data confirming printed paper ejection can be obtained.

In addition, since the number of logs maintained by a printer is narrowed down, depending on the model, printing events can be confirmed quickly by acquiring log entries, and the load imposed on a network and the processing load imposed on the printer can be reduced.

BRIEF DESCRIPTION OF THE DRAWINGS

FIG. 8 is a diagram showing a printer data storage file; and

FIG. 9 is a diagram showing a memory map for a storage medium on which the control program for a server is stored.

DETAILED DESCRIPTION OF THE PREFERRED EMBODIMENT

Figure 1:
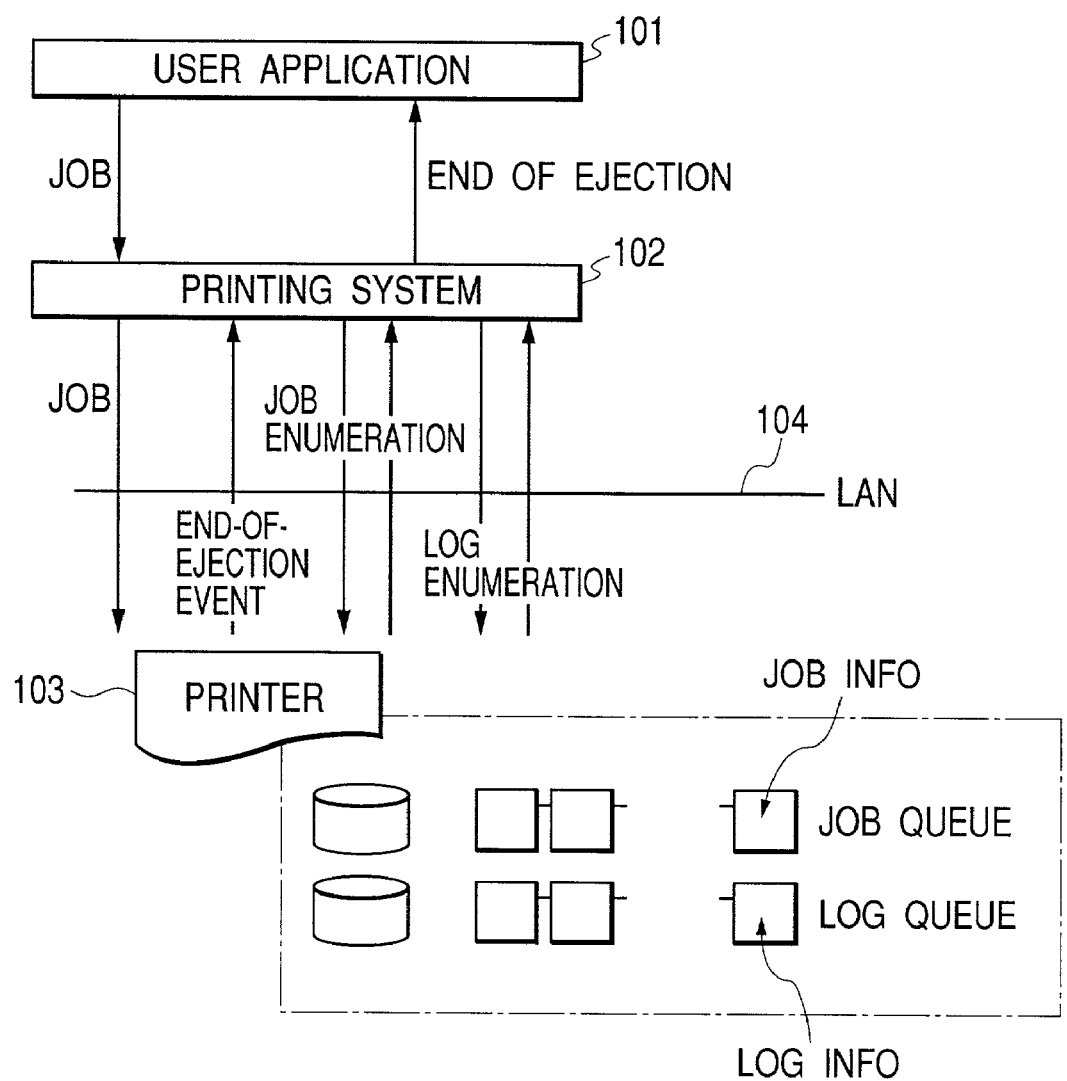
FIG. 1 is a block (functional) diagram showing the configuration of a system according to the present invention.

FIG. 1 is a block (functional) diagram showing the configuration of a system according to the present invention. In FIG. 1, the system comprises: a user application program (referred to as a client) 101 for printing; a printing system (referred to as a server) 102; and a network printer (referred to as a printer) 103 connected to the printing system 102 via a LAN 104.

In this embodiment, the client 101 issues a print request (job) to the server 102, and waits for the ejection end. The server 102 performs, relative to the printer 103, the transmission of an end-of-ejection event, the notification of enumerated jobs queued for printing, and the notification of enumerated logs indicating the printing results for the jobs.

Present in the printer 103 are a job queue and a log queue for printing results. A log is the history acquired for the processing of multiple jobs, and reflected for each job in the log are the transmission source of the job, the number of sheets of paper used for the job, and the end state of the job.

When the printer 103 receives a job entry event from the server 102, the printer 103 adds the job to the queue, processes jobs beginning with the first in the job queue, and ejects paper once the printing for each job is completed.

When the paper ejection is completed for a specific job, the printer 103 transmits an end-of-ejection event to the server 102, and as the process result, adds to the log queue the entry "successful ejection".

Upon receiving a job enumeration command from the server 102, the printer 103 transmits to the server 102 job information concerning a job in the job queue. While relative to the received log enumeration command, the printer 103 transmits log information concerning the log queue to the server 102.

Based on the end-of-ejection event, the job enumeration and the log enumeration, the server 102 notifies the client 101 that the paper ejection for the job has been normally completed. If, however, it is ascertained that the paper ejection has not been completed normally, even though the ejection process has been terminated, an "error" message is transmitted to the client 101.

Figure 2:
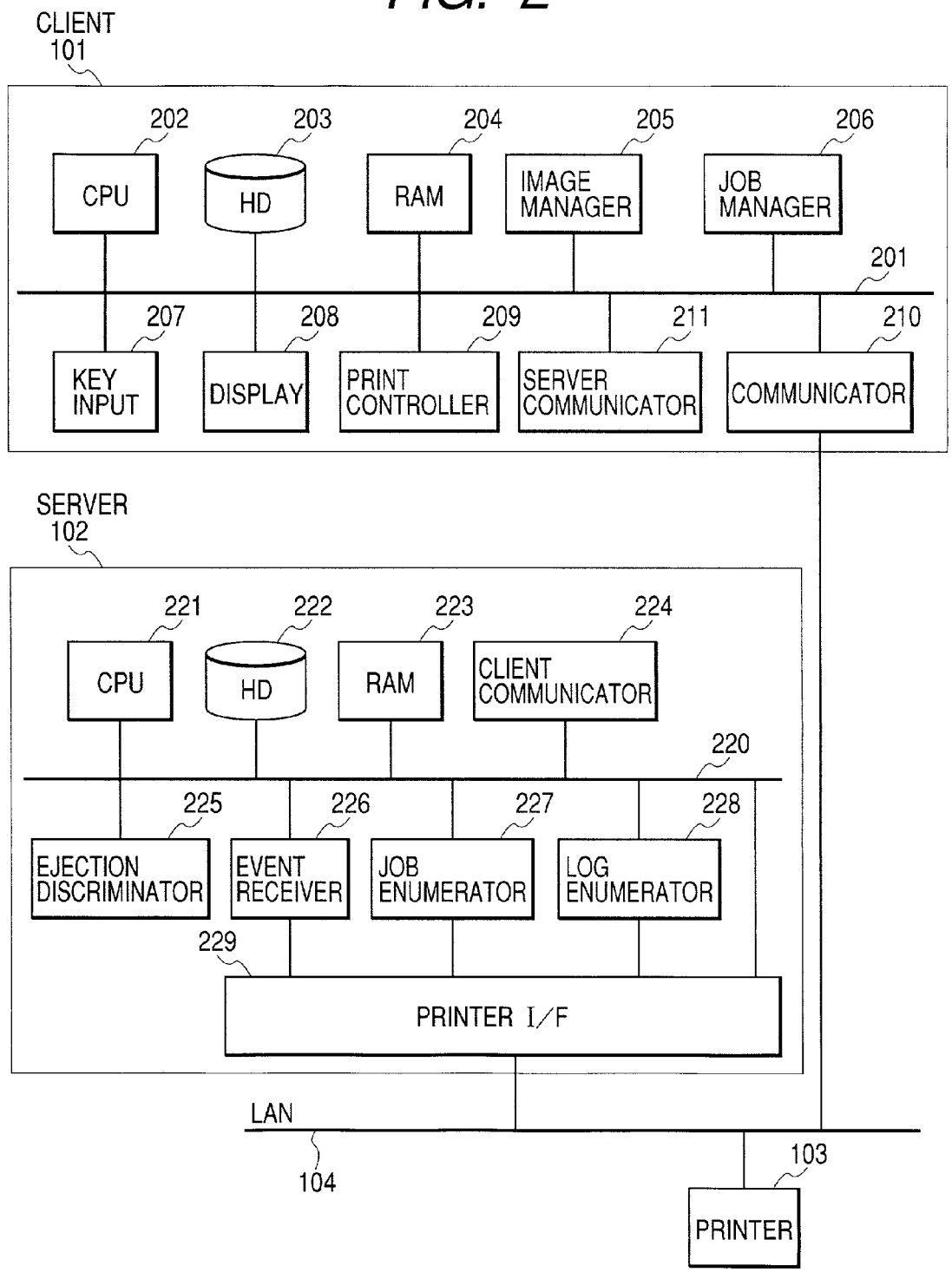
FIG. 2 is a diagram showing the control arrangement of a printing system according to the present invention.

FIG. 2 is a diagram showing the control configuration for a printing system according to the invention. The printing system comprises: the client 101, the server 102 and the network printer 103. The client 101 and the server 102 are mounted in a data processing apparatus (host computer), e.g., a personal computer or a workstation computer, and the network printer may be a copier having a printer function or a multi-function machine.

The client 101 comprises: a client system bus 201; a CPU 202, for controlling the client 101; a hard disk 203, on which control code (a control program) executed by the CPU 22 is stored; a RAM 204; an image manager 205, for managing jobs generated by a user application; a job manager 206, for managing job information; a key input unit 207, consisting, for example, of a personal computer; a display unit 208, such as a display monitor; a print controller 209, for controlling printing protocol, such as LPR, which is used to transmit a job to a printer; a communicator 210; and a server communicator 211, for performing a communication process, such as a RPC (Remote Procedure Call), and for communicating with the server 102.

When a job is entered by the user application in the client 101 or an external personal computer, the job is stored in the image manager 205, while the job information is managed by the job manager 206 using a queue format such as an FIFO.

The server 102 comprises: a server system bus 220; a CPU 221 for controlling the server 102; a hard disk 222, on which the control code (control program) executed by the CPU 221 is stored; a RAM 223; a client communicator 224; an ejection discriminator 225, for determining whether paper ejection for a job has been normally performed by the printer 103; an event receiver 226, for receiving an event notice from the printer 103; a job enumerator 227, for enumerating jobs in the printer 103; a log enumerator 228, for referring to a printing results log stored in the printer 103; and a printer I/F 229, for setting or analyzing the protocol employed for printer 103 and client 101 transactions.

A job image received from the user application is managed by the image manager 205, while the job information is managed by the job manager 206, and a printing request is transmitted to the server 102 by the server communicator 211. At this time, the printing request does not include print data, such as image data.

The server 102, which manages the printer 103, receives requests from multiple clients 101, and as soon as the printer 103 is available, transmits a print start response to the clients 101 through the client communicator 224. At this time, the server 102 inserts the allocated print ID into the print start response.

Upon receiving the print start response, the client 101 transmits a job to the printer 103 via the print controller 209 and the communicator 210, together with the print ID included in the print start response. The printer 103 adds the received job to a printing queue, from which it sequentially selects printing jobs beginning with the first received.

The job enumerator 227 of the server 102 transmits to the printer 103 a request for job information stored in the printing queue, and in return the printer 103 transmits all of the stored information to the server 102. The log enumerator 228 then issues a log information request to the printer 103, and in return the printer 103 transmits the requested information to the server 102.

When the printer 103 has printed a specific job and ejected the paper, it transmits an event notice to the server 102 that includes the print ID allocated for the job. This event notice is received by the event receiver 226. The printer discriminator 225 then determines the printed results for the job based on information received from the event receiver 226, the job enumerator 227 and the log enumerator 228. The results that are output are transmitted to the client 101 through the client communicator 224 and the server communicator 211, and are relayed to the user application by the client 101.

Figure 3:
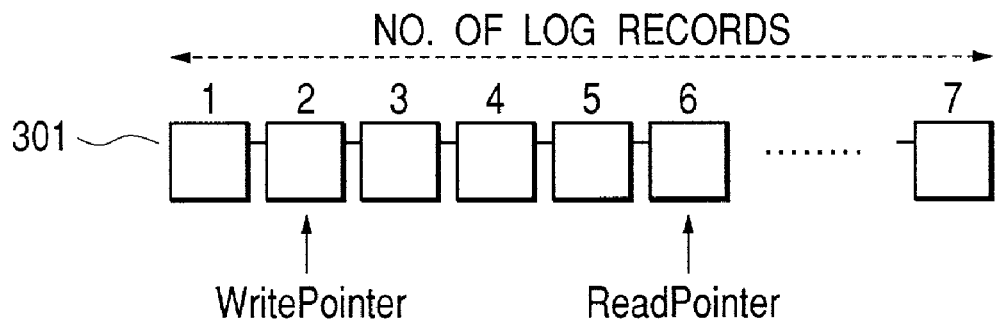
FIG. 3 is a diagram showing the configuration of a log queue for holding printing results.
Figure 4:
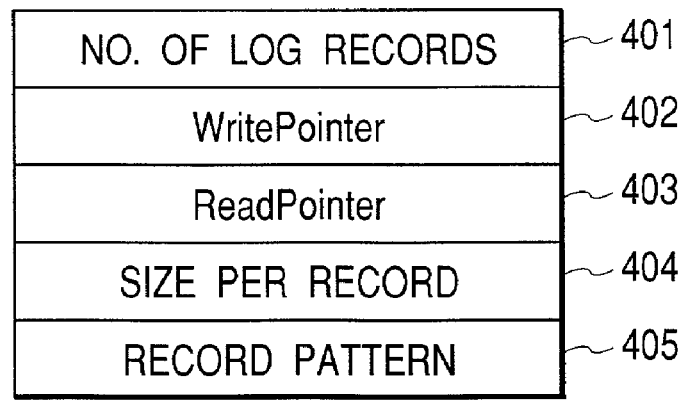
FIG. 4 is a diagram showing a log queue management area.

FIG. 3 is a diagram showing the structure of a log queue, stored in the printer 103, in which printing results are maintained. FIG. 4 is a diagram showing a management area for the log queue. A log queue 301 is managed based on the log queue management area. The log queue 301 is a ring buffer, and after information has been written in the last record, the information is then written in the first record.

The number of log records 401 indicates a fixed number allocated for each printer. A WritePointer 402 is a record in which the next printing results are registered, and especially indicates the number of records beginning with the first. A ReadPointer 402 is a log that is read when the log of the printer 103 is accessed by remote control. This ReadPointer 403, as well as the WritePointer 402, indicates the number of records beginning with the first.

Figure 5:
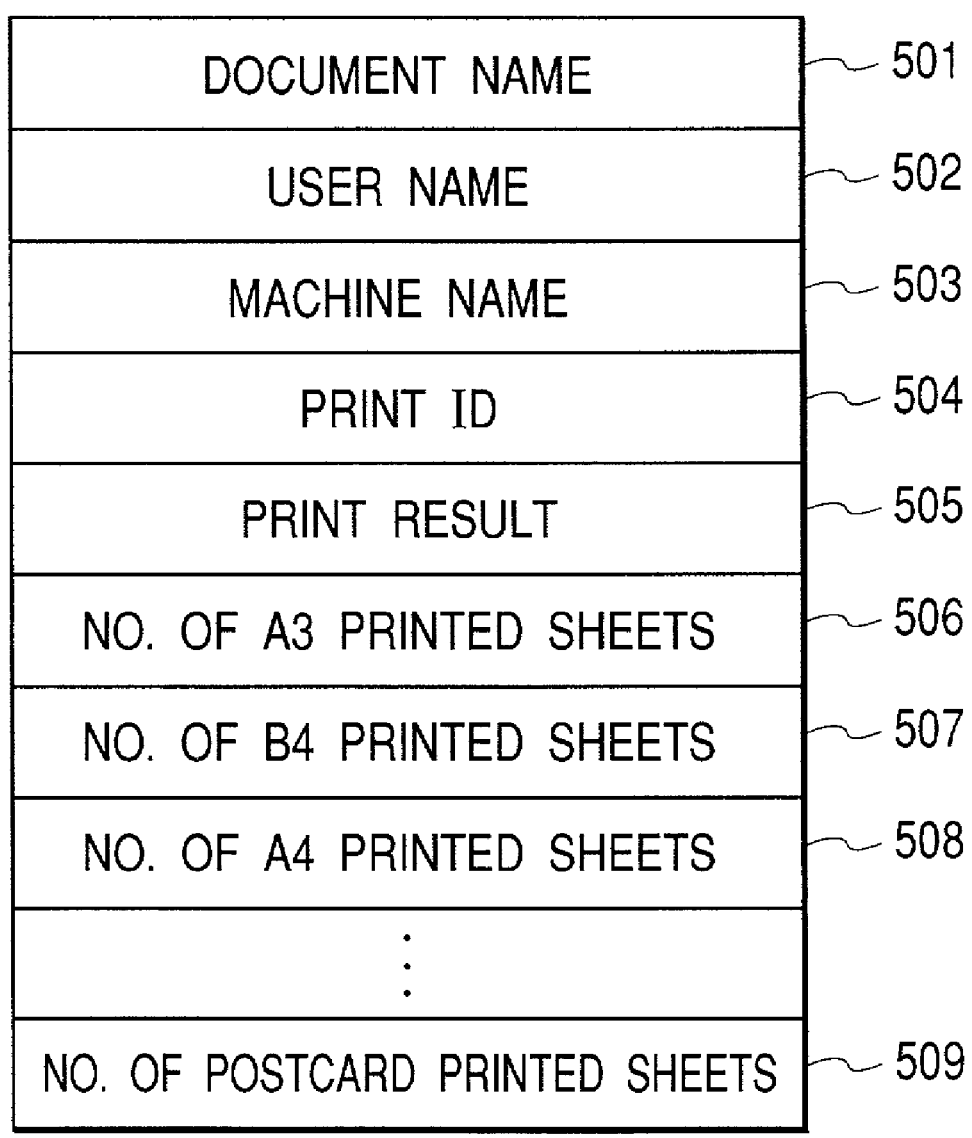
FIG. 5 is a diagram showing an example format for a log record.

A size per record 404 represents the number of bytes of data entered in a log for one record. When this size 404 is read by a remote device, the memory size required for reading the log is obtained. A record pattern 405 indicates the storage pattern of the parameters included in one log. That is, the record pattern 405 indicates one of the predetermined formats used for a log. FIG. 5 is a diagram showing an example format.

While an external device can refer to all the logs, it may refer to the management area in FIG. 4 in advance and read a log from the ReadPointer 403, or it may read multiple logs beginning with one acquired by tracking backward a predetermined number of logs from the WritePointer 402. The ReadPointer 402 may be operated by multiple external devices. Further, when a predetermined number of logs are tracked backward from the WritePointer 402, a check is performed to determine whether the log has been written to the last record. When the log is written to the record, the logs must be tracked backward by skipping from the first record to the last record.

In FIG. 5, the structure of one record includes a document name 501, for a print job; a user name 502, for the a user who entered the job; a machine name 503, for the personal computer that transmitted the job; a print ID 504, for identifying the job; a print result 505, indicating that the printing was normally terminated, i.e., that paper ejection was normally terminated, or that the job was terminated by being interrupted by a user or by the occurrence of power cutoff; the number 506 of A3 printed sheets, indicating the number of A3 sheets output during the printing of the job; the number 507 of B4 printed sheets; the number 508 of A4 printed sheets; and the number 509 of printed postcard size sheets. The numbers of various other types of sheets printed are also included. When the format in FIG. 5 is TYPE1, TYPE1 is written in the record 405 in FIG. 4.

Figure 6:
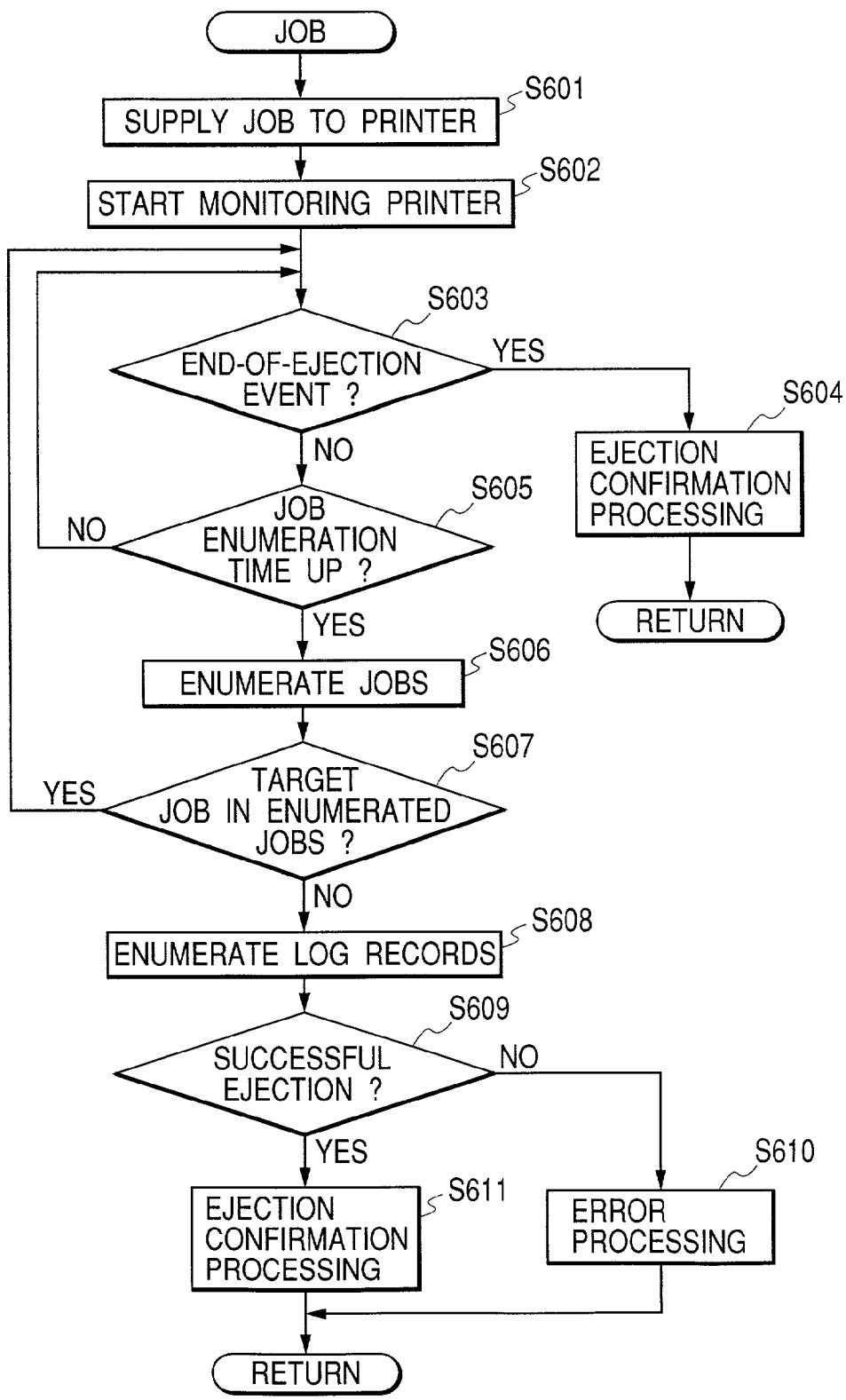
FIG. 6 is a flowchart showing the process performed by a server when obtaining the paper ejection results for a job.

FIG. 6 is a flowchart for the process performed by the server 102 when obtaining the paper ejection results for a job. At step S601, first, a job is transmitted to a network printer, the printer 103, using the LPR protocol. At step S602, monitoring of the printer 103, to which the job was transmitted, is begun. Specifically, event notices issued by the printer 103 are monitored, the job information is periodically monitored, and depending on the situation, the monitoring of the print logs in the printer 103 is begun.

At step S603, a check is performed to determine whether an end-of-ejection event has been received from the printer 103. If the event has been received, program control advances to step S604, and the ejection confirmation processing is performed. When and event has not been received, program control is shifted to step S605, and a check is performed to determine whether a job enumeration time has expired.

When the job enumeration time has not yet expired, program control returns to step S603. But if the job enumeration time has expired, program control advances to step S606 and a job enumeration command is transmitted to the printer 103. Then, the job information for all the print jobs in the printer 103 is obtained.

At step S607, a check is performed to determine whether a job having a specific print ID allocated by the server 102 is included in a printing queue. When there is such a job, it is assumed that the paper ejection has not been completed and the pertinent job is still present in the printer 103. This fact is confirmed, and program control returns to step S603. When the pertinent job is not present in the printing queue, program control advances to step S608, a log enumeration command is transmitted to the printer 103, and the print result log is obtained. Then, the log for the pertinent job is searched for among the coupled logs in the log queue. This search is performed based on the print ID entered in the record. At step S609, the print results for the pertinent log record are examined to determine how the job was printed. When it is ascertained that the paper ejection was normally completed, program control advances to step S611 and the ejection confirmation processing is performed. When a normal ejection can not be confirmed, it is assumed that an abnormality occurred during ejection and that the paper ejection was interrupted, and program control is shifted to step S610.

In the ejection confirmation processing at steps S604 and S611, the user application is notified that the paper ejection was confirmed, and this message is displayed on the display unit 208. While in the abnormality end process performed at step S610, for example, the user application is notified that all the pages of the job could not be completely ejected, and this message is displayed on the display unit 208.

Figure 7:
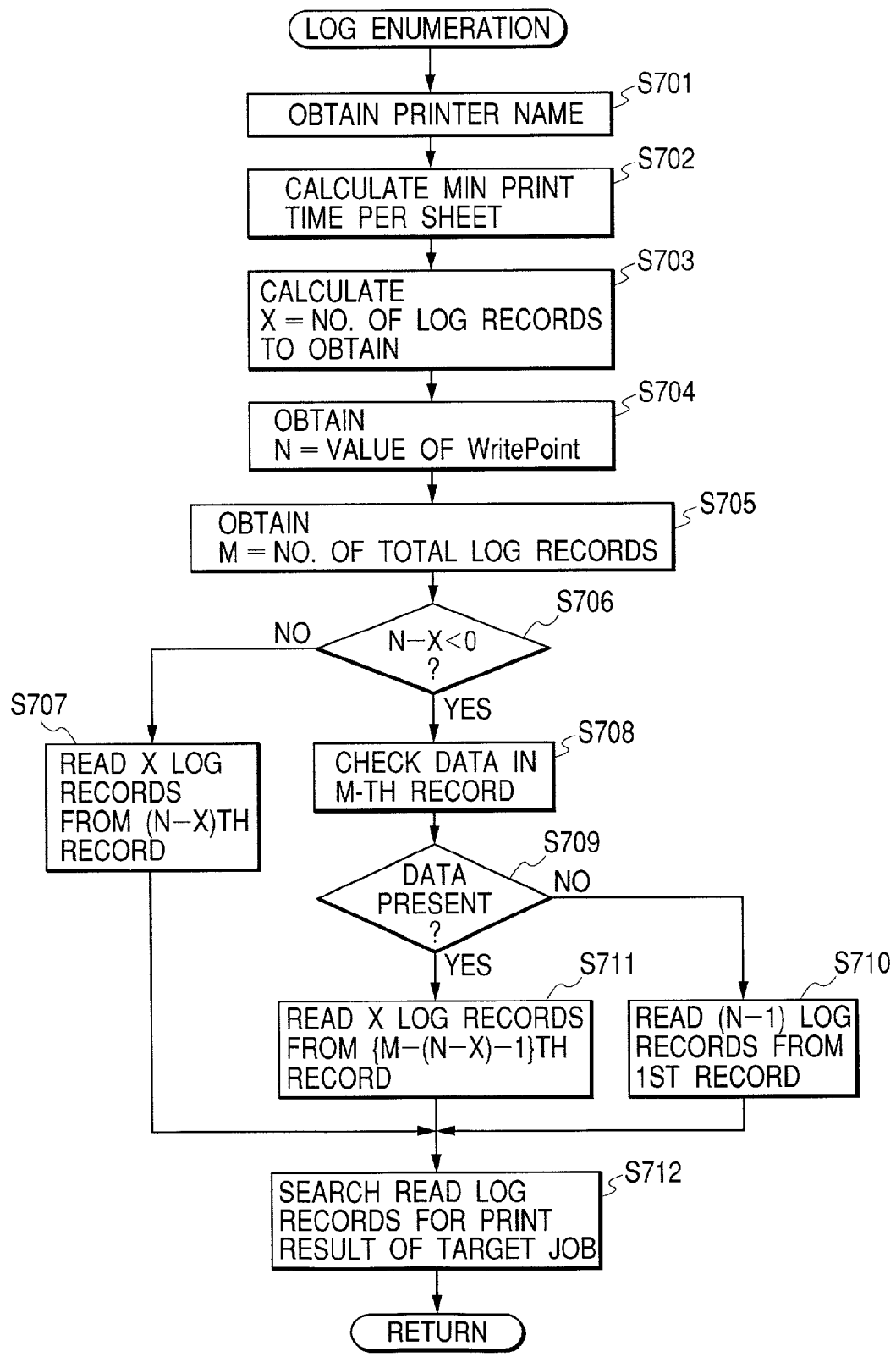
FIG. 7 is a flowchart showing the process used to obtain a printing result log.

FIG. 7 is a flowchart showing the process performed at step S608 to obtain a print result log. During this process, not all the print result logs are obtained; only a required number of logs are selectively acquired. At step S701, a check is performed to determine the printer from which a log is to be received, and the name of the printer is obtained. This printer name may be either the name of a printer object selected by a user, or the printer name received directly from the user application.

When the printer name is obtained at step S701, this printer name is searched for in a printer data storage file shown in FIG. 8, and the number of sheets printed by the printer in one minute is obtained. Using this printed sheet count, the minimum printing time for one sheet is obtained. For example, when the number of sheets printed in one minute is four, the minimum printing time for one sheet is 15 seconds. The minimum printing time for one sheet is calculated at step S702.

FIG. 8 is a diagram showing the contents of a printer data storage file. For example, in FIG. 8, the printer data L-2260, L-950 and L-840 are included as printer names. The printer having the printer name L-2260 is a color printer that is duplex printing capable, has a 7-bin tray, and can print four color sheets or 16 monochrome sheets a minute. An L-950 printer can print 24 sheets a minute, and an L-840 printer can print 16 sheets a minute.

At step S703, the number X of log records to be obtained (the number of logs to be obtained) is calculated using the log enumeration interval and the minimum printing time for one sheet. For example, when the log enumeration interval (interval for obtaining a log) is 60 seconds and the minimum printing time for one sheet is 15 seconds, the acquisition of four or five logs will be satisfactory, and not all the logs need be enumerated. That is, the number of logs must be obtained that is equivalent to the maximum number of jobs the printer 103 can process.

At step S704, a value N for the WritePointer 402 in the log queue management area is obtained. And at step S705, the total number M of logs is also obtained. Then, at step S706, the number X of logs is subtracted from the value N of the WritePointer 402, and a check is performed to determine whether the obtained value is a negative value. If the value is not negative, program control advances to step S707, and the logs are obtained by tracking backward X number of logs from the record indicated by the current WritePointer 402 entry. But if the value at step S706 is negative, program control advances to step S708. In this case, the log should be referred to beginning at the position where the reading is returned to the end of the queue as the ring buffer.

At steps S708 and S709, a check is performed to determine whether the data is present at the end of the queue. When at step S709 it is found the data is present, program control advances to step S711, and the log is obtained at a position obtained by tracking further backward from the end. That is, the logs from the first to the (N−1)th log in the queue and (X−N)+1 logs from the end of the queue are obtained. In other words, X logs, beginning with the from M−(X−N)−1-th log, are obtained. When data is not written in the last record, program control advances to step S710, and N−1 logs beginning from the first are obtained. At step S712, the log having the print ID of a target job is searched for in the group of logs that have been read, and the print result for the log is obtained.

Through this processing, the number of logs that must be read can be narrowed down, and the load imposed on the network and the processing loads imposed on the printer and the personal computer can be reduced.

FIG. 9 is a diagram showing the memory map for a storage medium on which the control program of the server 102 is stored. On the storage medium are stored a program for receiving an event notice from the printer 103, a program for obtaining job information for a job in the printer 103, a program for displaying the status of the printer 103, a program for obtaining printing results from the printer 103, a program for employing a printer name to calculate the number of print result logs to be obtained, a program for calculating a log acquisition start position, and a program for determining the paper ejection results for a job.

Although not shown, information for managing the group of programs stored on the storage medium, e.g., version information and creator names, is also recorded. Further, information that depends on the OS in use when the programs are read, e.g., icons for identifying and displaying programs, may also be stored.

The objective of the invention can also be achieved by supplying to a system or an apparatus (or a CPU or an MPU) a storage medium on which software program code that implements the functions of the embodiment is recorded, and by permitting the system or the apparatus to read and execute the recorded program code.

In this case, the program code read from the storage medium provides the functions of the invention, and the storage medium on which the program code is recorded constitutes the present invention.

The storage medium for supplying the program code can be, for example, a floppy disk, a hard disk, an optical disk, a magneto-optical disk, a CD-ROM, a CD-R, a magnetic tape, a nonvolatile memory card, a ROM or an EEPROM.

Further, the objective of the invention can also be achieved by supplying to a system or an apparatus (or a CPU or an MPU), via e-mail or across a network, a storage medium on which software program code implementing the functions of the embodiment is recorded, and by permitting the system or the apparatus to read and execute the recorded program code.

In addition, with the present invention it is not only possible for the functions of the previous embodiment to be provided through the execution of program code by a computer, but also, the program code can interact with an OS running on the computer, or with another software application, to provide the functions described in the above embodiment.

Furthermore, with the present invention, program code, read from a storage medium, can be written in a memory that is mounted on a function expansion board inserted into a computer, or in a function expansion unit connected to the computer, and in consonance with instructions in the program code, a CPU mounted on the function expansion board, or in the function expansion unit, can perform part or all of the actual processing required to implement the functions of the above described embodiment.

As is described above, according to the present invention, since a function for receiving an event notice from a printer, a function for obtaining information about a print wait job in a printer and a function for obtaining a print result log from a printer are provided, the ejection confirmation process for a job can be accurately performed at high speed.

Furthermore, since the number of logs obtained from a printer can be narrowed down in accordance with the model, the printing confirmation required following the acquisition of a log can be performed at high speed, and the loads imposed on a network and on the printer can be reduced.

What is claimed is:

1. A printing system, comprising:
   a printer in which log information indicating process results for respective jobs processed by said printer is stored even after processing of the jobs is finished;
   a client device, adapted for transmitting a job to said printer; and
   a server, adapted for:
   receiving, from said printer, a notification indicating a process result for the job transmitted by said client device;
   determining that said server receives the notification;
   obtaining, from said printer the log information corresponding to the transmitted job if said server does not receive the notification; and
   employing the obtained log information to determine the process result for the transmitted job.

2. A printing system according to claim 1, wherein, when said server does not receive the notification during a predetermined time, said server obtains the log information about the transmitted job, and employs the obtained log information to determine the process result for the transmitted job.

3. A printing system according to claim 1, wherein said server transmits to said client device information indicating the determined process result for the transmitted job.

4. A printing system according to claim 3, wherein, from among a plurality of pieces of log information about respective jobs stored in the printer, said server obtains a predetermined number of pieces of log information beginning with the latest piece of log information.

5. A printing system according to claim 4, wherein the printer stores, in a queue, the plurality of pieces of log information about the respective jobs, and wherein said server obtains the predetermined number of pieces of log information by tracking backward from a queue addition position.

6. A printing system according to claim 4, wherein said server calculates the predetermined number based on the printing speed of the printer.

7. A printing system according to claim 4, wherein said server calculates the predetermined number based on an interval at which said server obtains the log information.

8. A data processing apparatus, comprising:
   a reception unit coupled to a printer in which log information indicating process results for respective jobs processed by said printer is stored even after processing of the jobs is finished, said reception unit adapted for receiving, from said printer, a notification indicating a process result for a specific job processed by the printer;
   a first determination unit, adapted for determining whether said reception unit receives the notification;
   a log acquisition unit, adapted for obtaining, from said printer the log information corresponding to the specific job if said first determination unit determines that said reception unit does not receive the notification; and a second determination unit, adapted for determining the process result for the specific job based on the log information obtained by said log acquisition unit.

9. A data processing apparatus according to claim 8, wherein, when said reception unit does not receive the notification during a predetermined time, said log acquisition unit obtains the log information about the specific job, and said determination unit employs the obtained log information to determine the process result for the transmitted job.

10. A data processing apparatus according to claim 8, further comprising:
a notification unit adapted for transmitting to an external device information indicating the process result for the specific job.

11. A data processing apparatus according to claim 8, wherein, from among a plurality of pieces of log information about respective jobs stored in the printer, said log acquisition unit obtains a predetermined number of pieces of log information beginning with the latest piece of log information.

12. A data processing apparatus according to claim 11, wherein the printer stores, in a queue, the plurality of pieces of log information about the respective jobs, and wherein said log acquisition unit obtains the predetermined number of pieces of log information by tracking backward from a queue addition position.

13. A data processing apparatus according to claim 11, wherein said log acquisition unit calculates the predetermined number based on the printing speed of the printer.

14. A data processing apparatus according to claim 11, wherein said log acquisition unit calculates the predetermined number based on an interval at which said log acquisition unit obtains the log information.

15. A data processing apparatus according to claim 8, wherein the log information represents at least one of a document name for the job, a name of a user who enters the job, a machine name of a computer which transmits the job, an ID for identifying the job, a print result and the number of printed sheets.

16. A data processing apparatus according to claim 15, wherein the print results indicates that printing was normally terminated, that paper ejection was normally terminated, that the job was terminated due to interruption by the user or another user, or that the job was terminated by power cut-off.

17. A data processing apparatus according to claim 8, wherein said determination unit determines the process results based on whether or not all pages of the job were completely ejected.

18. A computer-readable storage medium on which is stored a control program, said control program permitting an apparatus to perform:
a reception step of receiving, from a printer in which log information indicating process results for respective jobs processed by said printer is stored even after processing of the jobs is finished, a notification indicating a process result for a specific job processed by the printer;
a first determination step of determining that said reception step receives the notification;
a log acquisition step of obtaining, from the printer the log information corresponding to the specific job if said first determining step determines that said reception step does not receive the notification; and
a second determination step of determining the process result for the specific job based on the log information obtained at said log acquisition step.

19. A computer-readable storage medium according to claim 18, wherein, when said reception unit does not receive the notification during a predetermined time, the log information about the specific job is obtained at said log acquisition step, and the obtained log information is employed at said determination step to determine the process result for the specific job.

20. A computer-readable storage medium according to claim 18, wherein said control program permits said apparatus to further perform:
a notification step of transmitting to an external device information indicating the determined process result for the specific job.

21. A computer-readable storage medium according to claim 18, wherein, at said log acquisition step, from among a plurality of pieces of log information about respective jobs stored in the printer, a predetermined number of pieces of log information is obtained beginning with the latest piece of log information set.

22. A computer-readable storage medium according to claim 21, wherein the printer stores, in a queue, the plurality of pieces of log information about the respective jobs, and wherein, at said log acquisition step, the predetermined number of pieces of log information is obtained by tracking backward from a queue addition position.

23. A computer-readable storage medium according to claim 21, wherein, at said log acquisition step, the predetermined number is calculated based on the printing speed of the printer.

24. A computer-readable storage medium according to claim 21, wherein, at said log acquisition step, the predetermined number is calculated based on an interval at which said log acquisition unit obtains the log information.

25. A process result confirmation method, comprising:
a reception step of receiving, from a printer in which log information indicating process results for respective jobs processed by said printer is stored even after processing of the jobs is finished, a notification indicating process result for a specific job processed by the printer;
a first determination step of determining whether said reception step receives the notification;
a log acquisition step of obtaining, from the printer the log information corresponding to the specific job if said reception step does not receive the notification; and
a second determination step of determining the process result for the specific job based on the log information obtained at said log acquisition step.

26. A process result confirmation method according to claim 25, wherein, when said reception unit does not receive the notification during a predetermined time, the log information about the specific job is obtained at said log acquisition step, and the obtained log information is employed at said determination step to determine the process result for the specific job.

27. A process result confirmation method according to claim 25, further comprising:
a notification step of transmitting to an external device information indicating the determined process result for the specific job.

28. A process result confirmation method according to claim 25, wherein, at said log acquisition step, from among a plurality of pieces of log information about respective jobs stored in the printer, a predetermined number of pieces of log information is obtained beginning with the latest piece of log information.

29. A process result confirmation method according to claim 28, further comprising:
   a storing step of storing, in a queue, the plurality of pieces of log information about the respective jobs,
   wherein, at said log acquisition step, the predetermined number of pieces of log information is obtained by tracking backward from a queue addition position.

30. A process result confirmation method according to claim 28, wherein, at said log acquisition step, the predetermined number is calculated based on the printing speed of the printer.

31. A process result confirmation method according to claim 28, wherein, at said log acquisition step, the predetermined number is calculated based on an interval at which said log acquisition unit obtains the log information.

32. A process result determination method according to claim 25, wherein the log information represents at least one of a document name for the job, a name of a user who enters the job, a machine name of a computer which transmits the job, an ID for identifying the job, a print result and the number of printed sheets.

33. A process result determination method according to claim 25, wherein the print results indicates that printing was normally terminated, that paper ejection was normally terminated, that the job was terminated due to interruption by the user or another user, or that the job was terminated by power cut-off.

34. A process result determination method according to claim 25, wherein said determination step determines the process results based on whether or not all pages of the job were completely ejected.

* * * * *